(12) United States Patent
Oroskar et al.

(10) Patent No.: US 8,233,899 B1
(45) Date of Patent: Jul. 31, 2012

(54) METHOD AND APPARATUS FOR MANAGING AIR INTERFACE NOISE IN A WIRELESS COMMUNICATION SYSTEM

(75) Inventors: Siddharth S. Oroskar, Overland Park, KS (US); Sachin R. Vargantwar, Overland Park, KS (US); Maulik K. Shah, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/034,193

(22) Filed: Feb. 24, 2011

(51) Int. Cl.
*H04W 4/00* (2009.01)
*H04W 36/00* (2009.01)
*H04B 15/00* (2006.01)

(52) U.S. Cl. ............... 455/432.1; 455/436; 455/63.1
(58) Field of Classification Search ......... 455/432.1, 455/436, 63.1
See application file for complete search history.

(56) References Cited

U.S. PATENT DOCUMENTS

| | | | |
|---|---|---|---|
| 5,369,681 A | 11/1994 | Boudreau et al. | |
| 5,594,946 A * | 1/1997 | Menich et al. | 455/522 |
| 6,181,945 B1 | 1/2001 | Lee | |
| 6,223,042 B1 | 4/2001 | Raffel | |
| 6,643,520 B1 | 11/2003 | Park et al. | |
| 6,745,039 B1 | 6/2004 | Di Lalla | |
| 6,922,561 B2 | 7/2005 | Chen et al. | |
| 6,963,750 B1 | 11/2005 | Cheng et al. | |
| 7,065,361 B1 | 6/2006 | Fortuna | |
| 7,260,415 B1 | 8/2007 | Oh | |
| 7,366,526 B2 | 4/2008 | Zhang et al. | |
| 2007/0105535 A1 | 5/2007 | Jacobson et al. | |
| 2008/0032713 A1 | 2/2008 | Yang | |
| 2008/0096520 A1 | 4/2008 | Benco et al. | |
| 2008/0293437 A1 | 11/2008 | Ranganathan et al. | |
| 2009/0061854 A1 | 3/2009 | Gillot et al. | |
| 2009/0247137 A1 | 10/2009 | Awad | |
| 2010/0056157 A1 * | 3/2010 | Verona et al. | 455/438 |

OTHER PUBLICATIONS

L. Cai, et al., "Mitigating DoS Attacks on the Paging Channel by Efficient Encoding in Page Messages," In: Proceedings of 5th International ICST Conference on Security and Privacy in communication Networks (SecureComm 2009), Sep. 2009.
U.S. Appl. No. 12/854,119, filed Aug. 10, 2010.
U.S. Appl. No. 12/854,114, filed Aug. 10, 2010.
U.S. Appl. No. 12/853,730, filed Aug. 10, 2010.
U.S. Appl. No. 12/261,229, filed Oct. 30, 2008.

* cited by examiner

*Primary Examiner* — Nick Corsaro
*Assistant Examiner* — Joel Ajayi (57) ABSTRACT

Disclosed is a method and system to help reduce the extent of roaming or use of lower priority coverage areas in a wireless communication system, by selectively managing the level of noise in a preferred coverage area. A network entity will detect that a particular coverage area has a high rate or roaming or that another coverage area (e.g., a collocated or adjacent coverage area) has a high rate of use, and the network entity will responsively reduce a noise threshold in the particular coverage area so as to then tolerate less noise in the coverage area before taking affirmative action to reduce the level of noise, and thus optimally to reduce the extent of roaming or use of less preferred coverage.

17 Claims, 5 Drawing Sheets

METHOD AND APPARATUS FOR MANAGING AIR INTERFACE NOISE IN A WIRELESS COMMUNICATION SYSTEM

BACKGROUND

In typical cellular wireless communications, each end-user device (e.g., cell phone, personal digital assistant, wirelessly equipped personal computer, etc.) subscribes to service from a given cellular wireless carrier (i.e., service provider) known as the device's home carrier. In practice, the home carrier will operate one or more radio access networks including base stations that radiate to define wireless coverage areas in which the end-user devices can operate. When a device enters into coverage of its home carrier's network, the device may register with the home carrier network and may then engage in wireless communication service via the home carrier's network, and the home carrier may accordingly charge or debit a service account of the device.

Although a typical cellular carrier may strive to offer wireless coverage throughout a region, such as nationally in the United States for instance, the carrier may not actually operate radio access networks in all locations throughout the region. To fill in gaps where the carrier does not operate its own radio access networks and thus where the carrier does not itself provide coverage, the carrier will typically enter into roaming agreements with other carriers. Under a roaming agreement, another carrier may agree to provide service to the home carrier's subscriber devices when the devices operate in the roaming carrier's network. Thus, when a device enters into coverage of a roaming carrier's network, the device may register for service with the roaming carrier's network and may then engage in wireless communication service via the roaming carrier's network. In accordance with the roaming agreement, the roaming carrier may then report that usage to the home carrier and may charge the home carrier for the usage. In turn, the home carrier may then pass that charge along to the service account of the device, or, for certain users, the home carrier may absorb the charge.

As a general matter, a home carrier may prefer to have its subscribers operate in coverage of the home carrier's network, rather than in coverage of a roaming carrier's network. One reason for this is that the home carrier will typically profit more when the home carrier charges the subscriber for use of the home carrier's network and services than when the home carrier merely passes a roaming carrier's charges along to the subscriber or absorbs the roaming charges. Another reason for this is that, when a subscriber is roaming, the subscriber may not benefit from full access to the home carrier's services and support, which may lead to poor user experience.

In addition, a home carrier may itself provide different types of coverage areas for its subscribers, and the home carrier may deem certain ones of its coverage areas to be higher priority or more preferable than others, just as the home carrier may deem its own coverage areas to be higher priority or more preferable than its roaming partner's coverage areas. For instance, in a given location, the home carrier may operate both a high-speed coverage area (such as a 4G or faster coverage area) and a lower-speed coverage area (such as a 3G coverage area), and the carrier may prefer that its subscriber devices operate in the high-speed coverage area so as to benefit from improved user experience.

OVERVIEW

Optimally, devices that subscribe to service of a home carrier will operate in preferred coverage areas of the home carrier, rather than operating in roaming partner coverage areas or in lower priority home coverage areas. Unfortunately, however, excessive noise in a preferred coverage area may cause devices to roam or operate in lower priority home coverage areas. In particular, if there is excessive noise in a home coverage area, subscriber devices may be unable to adequately communicate with the home network in that coverage area and, as a result, may search for and operate in a roaming partner's coverage area or in a lower priority home coverage area. In either case, the result may be increased cost for the home carrier or subscriber, and possibly diminished user experience.

Disclosed herein is a method and system to help reduce the extent of roaming or use of lower priority coverage areas, by selectively managing the level of noise in a preferred coverage area. In practice, a network entity will detect that a particular coverage area has a high rate or roaming or that another coverage area (e.g., a collocated or adjacent coverage area) has a high rate of use, and the network entity will responsively reduce a noise threshold in the particular coverage area so as to then tolerate less noise in the coverage area before taking affirmative action to reduce the level of noise, and thus optimally to reduce the extent of roaming or use of less preferred coverage.

The noise threshold may be a threshold that the network applies for the preferred coverage area as a basis to trigger reduction in data transmission rate of served subscriber devices. By reducing the noise threshold in response to detecting threshold roaming or threshold use of another coverage area, the home network may more readily detect a noise problem in the preferred coverage area and may thus more readily cause subscriber devices in the preferred coverage area to reduce their data transmission rate. As the served subscriber devices reduce their data transmission rate, the level of noise in the preferred coverage area may decrease, and the extent of roaming or use of less preferred coverage may consequently decrease.

These as well as other aspects, advantages, and alternatives will become apparent to those of ordinary skill in the art by reading the following detailed description, with reference where appropriate to the accompanying drawings. Further, it should be understood that the description provided by this document, including this overview section, is provided merely by way of example and is therefore open to variation.

DETAILED DESCRIPTION

Referring to the drawings, as noted above, FIG. 1 is a simplified block diagram of an example wireless communication system in which the present method and system can be implemented. As shown, the system includes a representative home network 12 operated by a home carrier and a representative roaming network 14 operated by a roaming partner.

Figure 1:
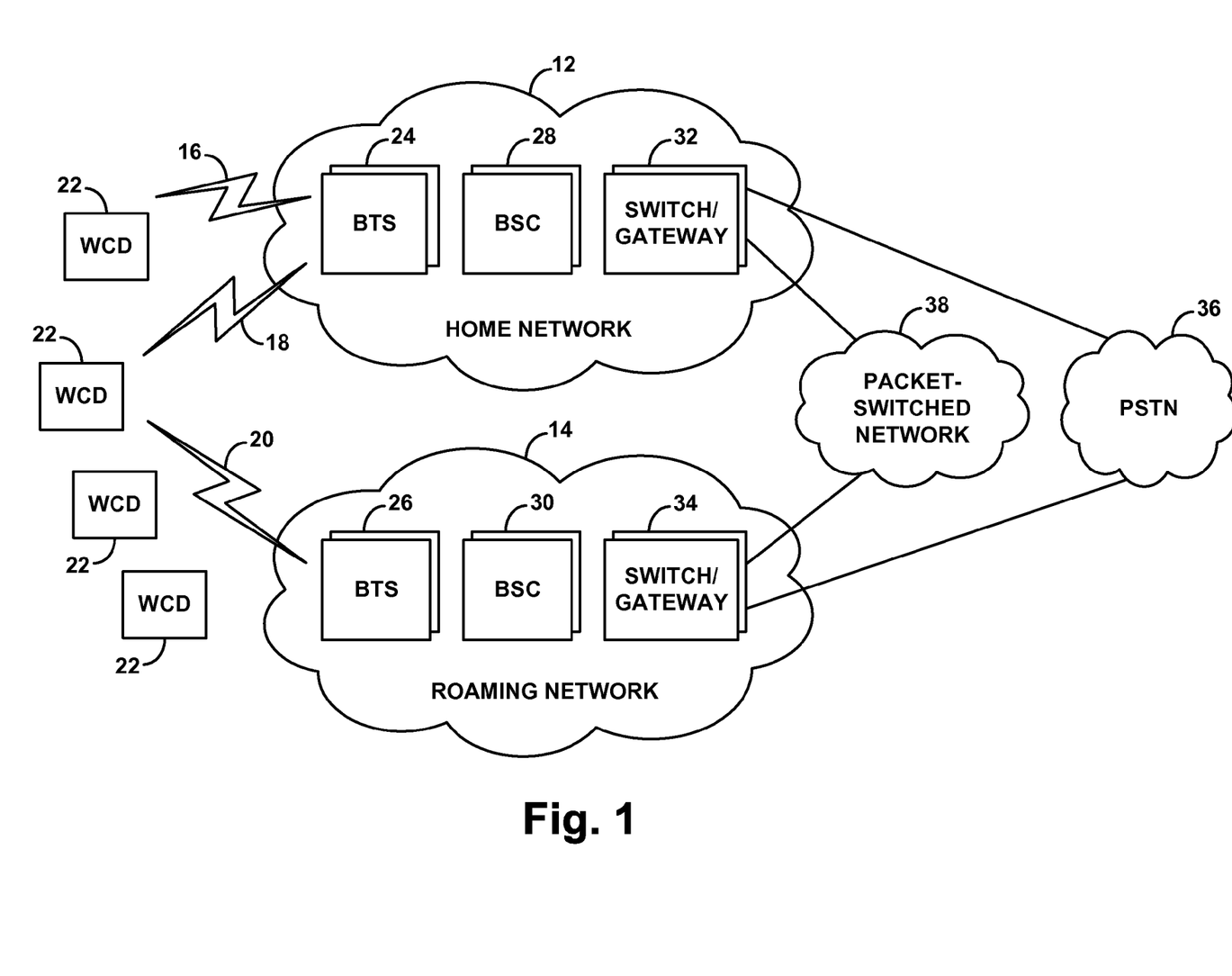
FIG. 1 is a simplified block diagram of a wireless communication system in which an exemplary embodiment of the present method can be implemented.

The home network 12 is shown radiating to define at least two representative coverage areas 16, 18, which may be collocated with or adjacent to each other, with coverage area 16 being deemed preferred or higher priority than coverage area 18. The basis for this preference or prioritization is not critical and may be a matter of design choice. By way of example, coverage area 16 may be a high-speed (e.g., 4G or later) coverage area, while coverage area 18 may be a lower speed (e.g., 3G) coverage area, and thus the home carrier may prefer to have its subscriber devices operate in coverage area 16 to improve user experience.

The roaming network 14 is shown radiating to define a representative roaming coverage area 20, which may be collocated with or adjacent to home coverage area 16. In view of roaming costs and related issues, the home carrier may consider the roaming coverage area 20 to be less preferable than home coverage area 16 and may thus again prefer to have its subscriber devices operate in coverage area 16.

The figure further depicts several representative wireless communication devices 22, which may subscribe to service of the home carrier and may be equipped to operate in any of the illustrated coverage areas. If home coverage areas 16, 18 operate with different air interface technologies, for instance, a representative device 22 may be a hybrid device that is equipped to operate with both of the air interface technologies and is thus capable of operating in coverage area 16 and coverage area 18. Further, the representative device may be equipped to operate with the air interface technology used by roaming coverage area 20, which may be the same as or different than the air interface technology used by either or both of the home coverage areas 16, 18. Thus, depending on various factors, such as coverage area loading for instance, representative devices may at various times be served by home coverage area 16, by home coverage area 18, or by roaming coverage area 20.

In the example arrangement shown, the home network 12 and roaming network 14 are each structured as a conventional radio access network (RAN) that functions to provide connectivity between served wireless devices 22 and one or more transport networks 24.

In particular, each RAN is shown by way of example including one or more representative base transceiver stations (BTSs) 24, 26 one or more representative base station controllers (BSCs) 28, 30 and one or more representative switches or gateways 32, 34. Each BTS may include transceiver equipment and antennas that radiate to define one or more coverage areas in which representative devices 22 can operate. Each BTS is then coupled or integrated with a BSC, which may control aspects of air interface operation such as handoff between coverage areas for instance. In turn, each BSC is coupled with a switch such as a mobile switching center (MSC) or media gateway that may control aspects of RAN operation and may provide connectivity with the public switched telephone network (PSTN) 36, and each BSC may further be coupled with a gateway such as a packet data serving node (PDSN) that may provide connectivity with a packet-switched network 38 such as the Internet. With this arrangement, a subscriber device may be able to communicate through a serving RAN with other subscriber devices or with entities on the PSTN or packet-switched network.

It should be understood that the RAN arrangements shown in FIG. 1 are merely examples, and that numerous other arrangements are possible as well. By way of example, various RAN components could be combined together, distributed, substituted, added, omitted, or provided under other names. For instance, a radio network controller (RNC) could be provided in place of a BSC. Further, a representative BTS, alone or in combination with a BSC or RNC, could be a macro network base station comprising a typical public cell tower for instance, or could be a femtocell operated in a home or office and coupled through a broadband network with other components of the RAN. RANs can also differ in structure and function from each other.

Each coverage area provided by a RAN may operate under a defined air interface protocol, examples of which include CDMA 1xRTT, CDMA 1xEV-DO, WiMAX, LTE, IDEN, GSM, WIFI, HDSPA, and others now known or later developed. These protocols may support particular speeds of communication and particular types of communication. In practice, a representative RAN and its served subscriber devices will each be arranged with hardware and logic to facilitate communication with each other according to an agreed protocol.

As noted above, a given RAN may support communication according to various different air interface protocols, such as both CDMA 1xRTT and CDMA 1xEV-DO, or both 1xEV-DO and WiMAX for instance. To facilitate this, a representative BTS may include separate hardware and logic to support communication respectively on the various protocols. Such a BTS may thus provide one or more coverage areas on one air interface protocol and one or more separate but possibly collocated coverage areas on another air interface protocol.

Each coverage area may include a forward link over which communications pass from the BTS to subscriber devices, and a reverse link over which communications pass from subscriber devices to the BTS. These links may in turn define various air interface channels for carrying particular types of communications. For instance, the forward link may define (i) a pilot channel on which the BTS broadcasts a pilot signal that subscriber devices can monitor to evaluate and identify available coverage, (ii) one or more paging channels on which the BTS can page particular subscriber devices, and (iii) one or more traffic channels on which bearer traffic such as voice and other user data can be conveyed to subscriber devices. And the reverse link may define (i) one or more access channels on which subscriber devices can send registration messages, session initiation messages, and the like, and (ii) one or more traffic channels on which bearer traffic can be conveyed to the BTS. These air interface channels may be defined on one or more carrier frequencies, and through code division multiplexing, time division multiplexing, frequency division multiplexing, and/or another mechanism now known or later developed.

In practice, when a subscriber device is not engaged in an active communication session such as a voice call or data session for instance, the device is considered to be idle or dormant. In that state, the device scan for available coverage in a priority order defined by a preferred roaming list (PRL). Typically, the PRL would cause the device to search for a home coverage area first and, among home coverage areas, to search for a coverage area the operates under a preferred air interface protocol. For instance, if the home network provides coverage areas operating under 1xEV-DO and coverage areas operating under 1xRTT, the PRL may prioritize 1xEV-DO over 1xRTT, and so the device may search for a home 1xEV-DO coverage area and only if it does not find one then search for a home 1xRTT coverage area. Due to cost and other considerations, the PRL may then list roaming coverage areas with lower priority than home coverage areas. Thus, if the device does not successfully find a home coverage area, the device may then search for a roaming coverage area. Other PRL arrangements are possible as well.

Once the device finds a sufficiently strong coverage area, the device may then register with the serving RAN in that coverage area, so that the RAN would have a record of where the device is located. In the event the device registers through this process with a roaming network coverage area, the roaming network may signal to the home network so that the home network would have a record of where the device is located.

When the device then seeks to initiate a communication session or the RAN seeks to connect a communication to the device, the RAN may assign a traffic channel or traffic channel resource (e.g., timeslots) in the coverage area for use by the device to engage in the communication.

During the course of a communication session, the subscriber device may then continue to monitor the pilot signal of its serving coverage area and the pilot signals of other coverage areas in its vicinity. If the device detects a threshold stronger pilot signal from another coverage area, the device may then work with the RAN to orchestrate a handoff of the communication session from the current coverage area to the other coverage area if possible.

In some cases, handoff of a subscriber device may require the subscriber device to transition between wireless carrier networks and/or between air interface protocols, from a more preferred coverage area to a less preferred coverage area. For instance, if the device is currently served by a home coverage area and begins to lose coverage but does not detect another sufficiently strong home coverage area, the device may be forced to hand off to a lower priority roaming coverage area. Further, if the device is currently served by a coverage area under a high priority air interface protocol (such as 1xEV-DO for instance) and begins to lose coverage but does not detect another sufficiently strong coverage area under the same protocol, the device may be forced to hand off to a coverage area that operates under a lower priority air interface protocol (such as 1xRTT for instance). These types of handoffs may involve loss of the communication session followed by re-initiation of the communication session in a new coverage area. Alternatively, a mechanism may exist to facilitate more seamless handoff.

When a subscriber device hands off between coverage areas in a given network, such as within a home carrier's network, the network may store a record of the handoff for later reference and may update records to indicate the current location of the device. Further, when a subscriber device hands off from a home coverage area to a roaming coverage area, the roaming network may signal to the home network so that the home network would have a record of where the device is located.

In practice, a serving network may keep a record of communication sessions in which subscriber devices engage, to facilitate usage tracking and billing. As a subscriber device operates in a home network, for instance, the home network may keep records of the extent of communication, to facilitate billing the device user. As a subscriber device operates in a roaming network, the roaming network may likewise keep records of the extent of communication, and the roaming network may in real-time or at some later time report the usage to the home network to facilitate billing reconciliation. Records of communication may comprise call detail records for voice calls, usage data records for data communications, and the like, and may provide information such as start time, length or quantity of communication, end time, and serving system location for instance.

As a RAN serves one or more subscriber devices (e.g., in active communication sessions) in a given coverage area, the RAN may regularly evaluate the level of reverse link noise that the RAN detects in the coverage area, and depending on the level of reverse link noise, the RAN may cause served subscriber devices in the coverage area to adjust their reverse link transmission power in an effort to help control the level of noise. One way to cause devices to reduce their reverse link transmission power is to cause the devices to reduce their reverse data transmission rates.

By way of example and without limitation, consider the 1xEV-DO (IS-856) protocol. Under 1xEV-DO, a BTS serving a given coverage area continually measures an aggregate of reverse link receive power and periodically (namely, every 1.67 millisecond timeslot) computes a noise metric referred to as reverse noise rise (RNR). RNR is the difference between (i) the reverse noise that the BTS is currently detecting and (ii) a baseline level of reverse noise. Thus, the BTS computes how far the reverse noise has risen above that baseline. When the computed RNR exceeds a threshold RNR value, the BTS sets a Reverse Activity Bit (RAB) to one; when the computed RNR does not exceed the threshold RNR value, the BTS sets the RAB to zero. The BTS then uses the RAB to cause served subscriber devices to adjust their reverse data transmission rates and thus their reverse transmission power.

In particular, the BTS periodically broadcasts the RAB in the coverage area, and each active subscriber device in the coverage area may then adjust its reverse data rate and power according to the RABs that it receives. For instance, under one version of 1xEV-DO, a subscriber device will determine a probability value based on its current reverse data rate and will apply the probability value to a randomly generated number, as a basis to determine whether to adjust its data rate and power. In accordance with that analysis, a RAB value of one may cause the device to reduce its data rate to a next lower specified rate and to accordingly reduce its reverse transmission power, whereas a RAB value of zero may cause the device to increase its data rate to a next higher specified rate and to accordingly increase its reverse transmission power. Statistically, this process will thus cause some or all of the active subscriber devices in the coverage area to reduce their reverse data rates and reverse transmission power when the BTS has detected threshold high RNR, and to increase their reverse data rates and reverse transmission power when the BTS has not detected threshold high RNR.

In 1xEV-DO, the RNR threshold is a configurable system parameter that can range from 0 db to 30 db. Depending on system design and air interface protocol, however, other reverse noise thresholds could be applied in a given system to similarly trigger adjustment of reverse data rate and/or reverse transmission power. To generalize, a RAN may apply a reverse noise threshold for a given coverage area as a basis to trigger adjustment of the reverse data rate and/or reverse transmission power of subscriber devices operating in the coverage area.

As noted above, the present method seeks to reduce the extent of roaming or use of lower priority coverage areas in a wireless communication system, by selectively managing the level of noise in a preferred coverage area. In particular, the method functions by detecting a threshold extent of roaming away from a preferred coverage area, such as a threshold extent of usage of an adjacent lower priority coverage area for instance, and responsively reducing a noise threshold in the preferred coverage area so as to tolerate less noise in the preferred coverage area before taking action designed to reduce the level of noise. By more quickly triggering a reduction of noise in the preferred coverage area, the extent of roaming or use of less preferred coverage may optimally be reduced.

The method can be implemented automatically by one or more RAN entities such as a BTS, BSC, or MSC for instance, or by one or more other computing systems but, for simplicity, may be considered generally as being carried out by a wireless communication system or by a wireless carrier. The method results in a tangible change in the configuration and operation of a RAN, in the form of an adjustment in the reverse noise threshold and consequent adjustment in reverse data rate and/or reverse transmission power of served subscriber devices.

A wireless carrier may detect threshold roaming away from a preferred coverage area or threshold usage of another coverage area (e.g., an adjacent lower priority coverage area) in various ways.

By way of example, as noted above, a wireless carrier may maintain records of usage in each of its coverage areas. The usage could be measured and recorded in various ways, such as number of active communication sessions per unit time, quantity of data communicated per unit time, or percentage of air interface capacity used over time, for instance. Further, the wireless carrier may have data that defines the proximity (e.g., adjacency, co-location, etc.) between coverage areas. Thus, by programmatically evaluating the usage data and proximity data, the wireless carrier can determine that there has been a particular extent of usage in a coverage area adjacent to, collocated with, or otherwise positioned in relation to a preferred coverage area.

As another example, as also noted above, a wireless carrier may maintain records of handoffs between coverage areas. Through programmatic evaluation of that data, the wireless carrier may determine an extent to which devices tend to hand off from one coverage area to another, such as from a more preferred coverage area to a less preferred coverage area.

Likewise, a wireless carrier may receive records from a roaming partner indicating instances of roaming into the roaming partner's network. Such records may indicate start time of such roaming and perhaps location of such roaming. The wireless carrier may then programmatically correlate those roaming records, based on time, device ID, location, and/or other parameters, with records of usage in the wireless carrier's own network, such as by identifying instances where the wireless carrier's subscribers were operating in a home coverage area and within a threshold time of such operation or of loss of such operation (e.g., call drop) began roaming in a roaming coverage area. In this regard, situations where roaming usage followed quickly after loss of operation in a home coverage area may be deemed incidents of dropped calls leading to roaming.

Through programmatic evaluation of such data, the wireless carrier may thereby determine an extent to which subscriber devices in a particular home coverage area tend to leave that coverage and enter into less preferred roaming coverage, or the extent to which devices that could operate in home coverage instead operate in roaming coverage. For instance, considering the coverage areas shown in FIG. 1, the home carrier may determine for a given period of time how many of its subscriber devices in total were operating in total in coverage areas 18 and 20 and may then determine a roaming percentage as a percentage of that total number subscribers that were operating in roaming coverage area 20.

Further, a wireless carrier may more simply use such roaming records as a basis to programmatically determine an extent to which the wireless carrier's subscriber devices tend to operate in a roaming coverage that is adjacent to, collocated with, or otherwise positioned in relation with home coverage.

Other metrics and techniques for detecting an extent (e.g., percentage or other measure of extent) to which subscriber devices tend to roam-away from a particular coverage area or operate in another coverage area can be applied as well.

Further, this evaluation can occur continually in the background, so as to regularly establish for a particular coverage area a measure of the extent to which devices tend to roam away or hand off from the coverage area into a less preferred coverage area and/or the extent of usage in another coverage area such as one that is adjacent to or partially or completely collocated with the particular coverage area. The evaluation can thus occur substantially in real-time, based on a latest set of usage data. Alternatively, the evaluation can be done in some other manner as post-processing of historic usage data.

Given such a measure for a particular coverage area, the wireless carrier may then programmatically adjust the reverse noise threshold in the particular coverage era, so as to trigger adjustment of reverse transmission power and/or reverse data rate in the particular coverage area. This adjustment reverse noise threshold can be done in various ways.

By way of example, the wireless carrier may maintain a data table that correlates various reverse noise thresholds for a particular coverage area with respective ranges of roaming away from the coverage area or usage of other coverage areas. Using an RNR threshold as an example, the table could be as follows:

| Roaming Percentage | RNR threshold |
|---|---|
| x > 80% | 3 dB |
| 80% < x < 50% | 3.5 dB |
| 50% < x < 20% | 4 dB |
| x < 20% | 5 dB (default) |

Each time the wireless carrier determines a current roaming percentage for the particular coverage area, the wireless carrier may then accordingly set or adjust the RNR threshold for the coverage area. If this process is implemented by a RAN entity such as a BTS that itself maintains and applies the reverse noise threshold, that entity may simply change the threshold in its data storage so as to then apply the changed threshold. Alternatively, if this process is implemented by some other entity, the other entity may publish the new threshold or extent of adjustment, for reference by the entity that will apply the threshold.

Figure 2:
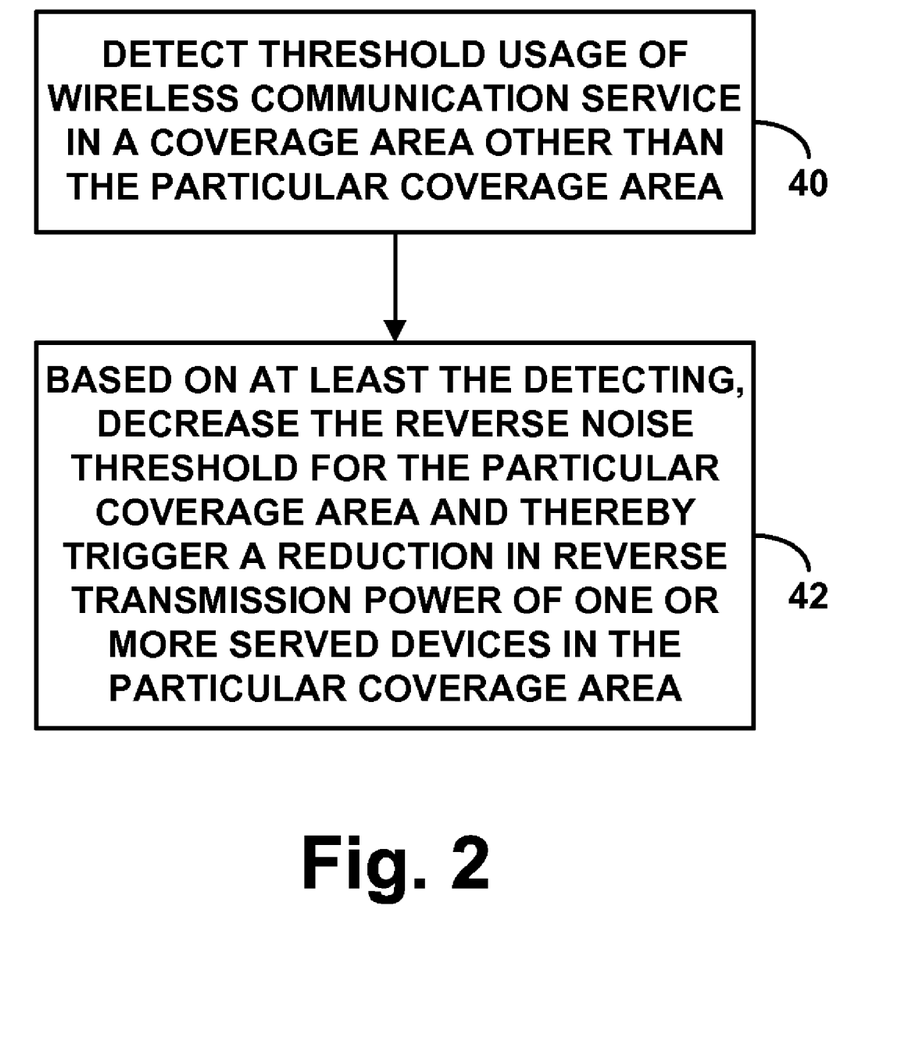
FIG. 2 is a flow chart depicting functions that can be carried out in the present method.

FIG. 2 is a flow chart depicting functions that can be carried out in accordance with the present method, to manage air interface noise in a particular coverage area of a wireless communication system, where the system applies a reverse noise threshold (e.g., RNR threshold) for the particular coverage area as a basis to manage reverse transmission power of served devices in the particular coverage area.

As shown in FIG. 2, at block 40, the method involves detecting threshold usage of wireless communication service in a coverage area other than the particular coverage area. This act of detecting threshold usage in the other coverage area may involve detecting threshold roaming or handoff from the particular coverage area to the other coverage area, threshold extent of communication session initiation in the other coverage area rather than in the particular coverage area, or perhaps just threshold usage in the other coverage area without comparison with the particular coverage area.

Optimally, the other coverage area would be partially or fully collocated with the particular coverage area or adjacent to the particular coverage area, but this is not necessarily the case. Further, the other coverage area would optimally have a lower priority or preference than the particular coverage area, such as by using a less preferred air interface protocol or by being a roaming coverage area versus a home coverage area for instance.

At block 42, the method then involves, based on at least the detecting, decreasing the reverse noise threshold for the particular coverage area and thereby triggering a reduction in reverse transmission power of one or more served devices in the particular coverage area. As with the example above, this function may involve referring to a table that correlates various reverse noise thresholds with various ranges of roaming away from the particular coverage area, or with various extents of usage in the other coverage area, so as to determine an applicable reverse noise threshold or adjustment to reverse noise threshold. This function may then involve adjusting the reverse noise threshold accordingly, so as to then tolerate less reverse noise before taking affirmative action to cause one or more served devices in the particular coverage area to reduce their reverse transmission power and/or reverse data rate.

The decreasing of reverse noise threshold may be based on additional factors beyond the detecting of threshold usage in the other coverage area. For instance, the decreasing of reverse noise threshold may also be conditioned on the other coverage area being threshold collocated with the particular coverage area and/or on the usage in the other coverage area occurring after call drops or other performance issues in the particular coverage area. Other examples are possible as well.

As noted above, decreasing of reverse noise threshold may result in reduction of the transmission power of one or more served devices in the particular coverage area by causing the devices to reduce their reverse data transmission rate, which may cause the devices to accordingly reduce their reverse transmission power. Further, the decreasing of reverse noise threshold can be done automatically by a network entity in response to detecting the threshold extent of usage.

Figure 3:
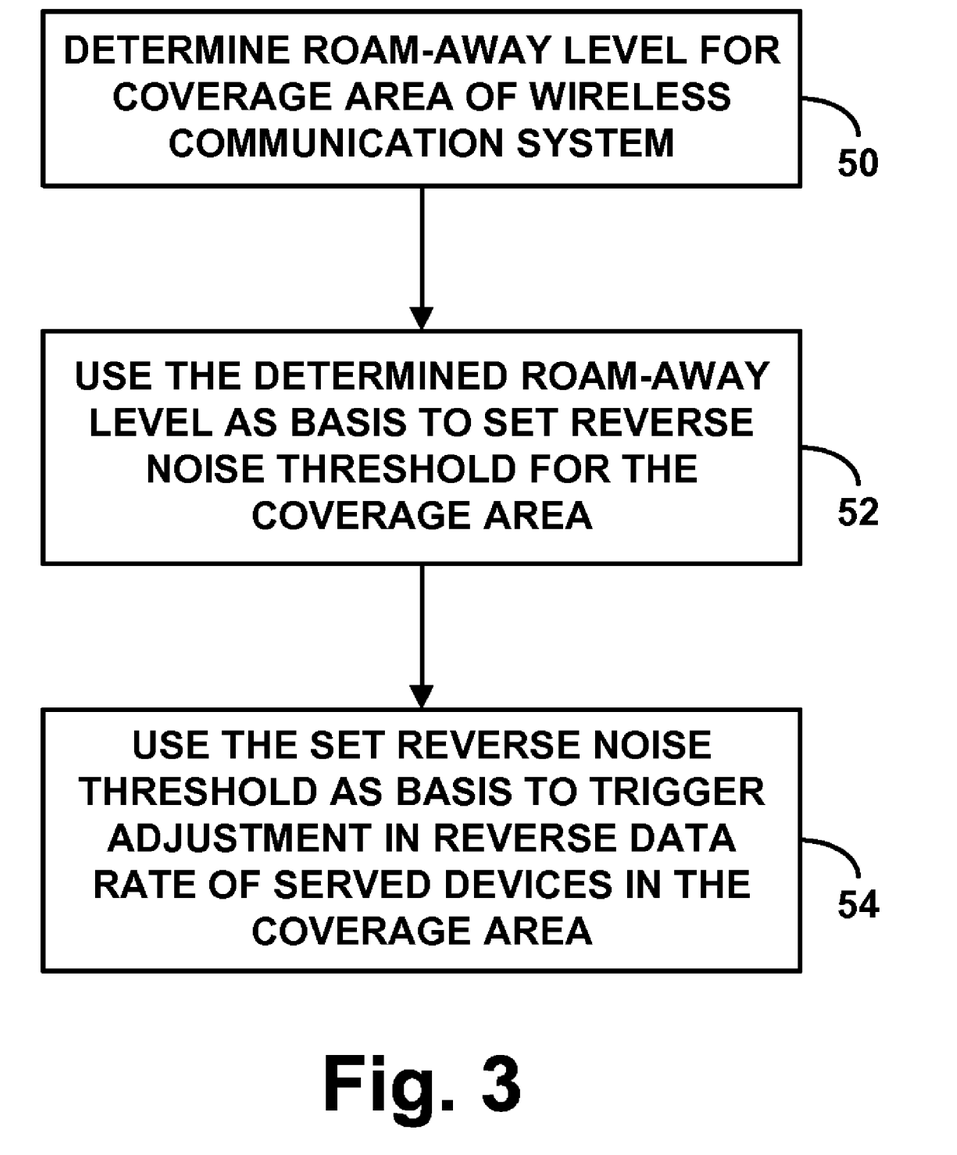
FIG. 3 is another flow chart depicting functions that can be carried out in the present method.

FIG. 3 is next another flow chart depicting functions that can be carried out in accordance with the present method, to manage air interface noise in a wireless communication system.

As shown in FIG. 3, at block 50, the method involves determining a roam-away level for a coverage area of the wireless communication system. For instance, as discussed above, this function may involve determining an extent to which subscriber devices initiated communications in a roaming coverage area rather than in a collocated or adjacent home coverage area and/or an extent to which subscriber devices transitioned from operating in home coverage to operating in roaming coverage perhaps quickly following loss of home coverage.

At block 52, the method then involves using the determined roam-away level as a basis to set a reverse noise threshold for the coverage area. As discussed above, this function can involve setting or adjusting the reverse noise threshold based at least in part on the determined roam-away level, such as by applying a correlation data table for instance.

At block 54, the method then involves using the set reverse noise threshold as a basis to trigger adjustment in reverse data rate of served devices in the coverage area. This function can be carried out by having the serving RAN evaluate reverse noise, such as RNR for instance, and determining whether the reverse noise is greater than the reverse noise threshold, and (i) if the reverse noise is greater than the reverse noise threshold, then broadcasting a RAB or the like that will cause some or all subscriber devices in the coverage area to reduce their reverse data rate and accordingly to reduce their reverse transmission power, or (ii) if the reverse noise is not greater than the reverse noise threshold, then broadcasting a RAB or the like that will cause some or all subscriber devices in the coverage area to increase their reverse data rate and accordingly to increase their reverse transmission power.

In practice, the wireless carrier whose RAN carries out this function may have distributed (e.g., sold) the subscriber devices that would be served in the coverage area, and would have configured those subscriber devices to respond to the broadcast RAB in a manner similar to that described above, so that some or all of the subscriber devices in the coverage area would adjust their reverse data transmission rate and accordingly adjust their reverse transmission power.

Figure 4:
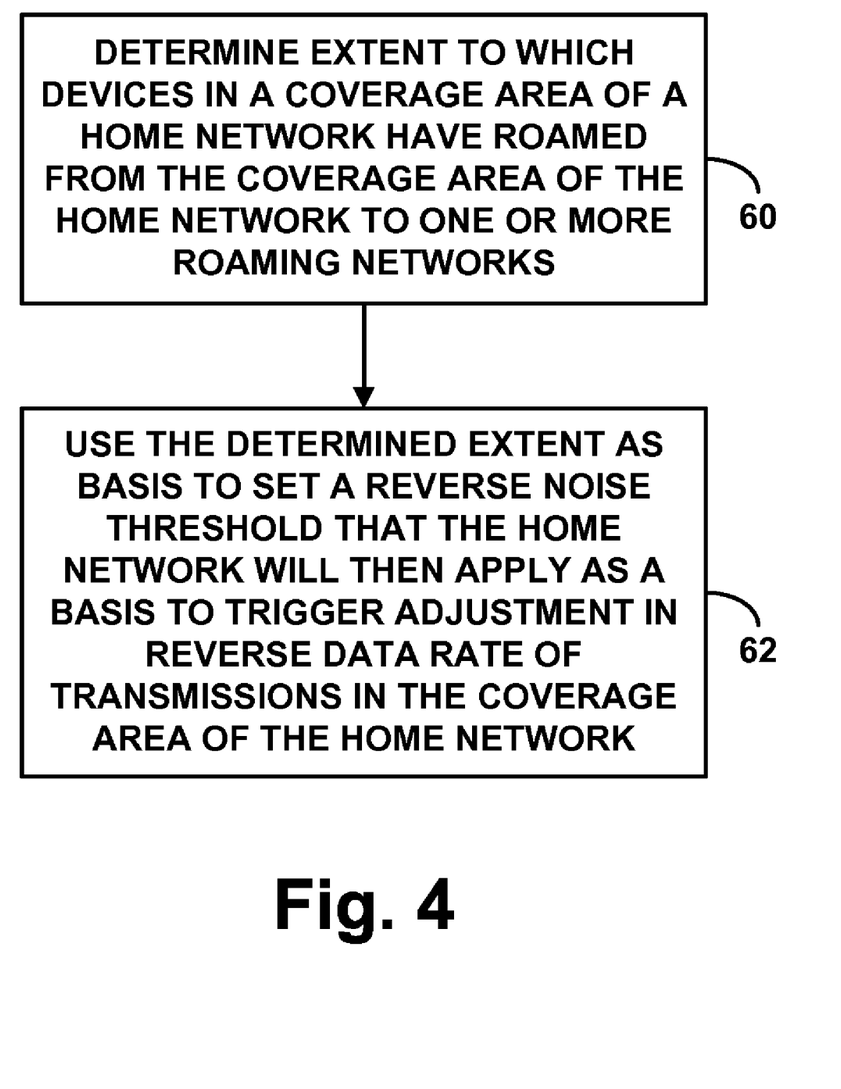
FIG. 4 is still another flow chart depicting functions that can be carried out in the present method.

FIG. 4 is next another flow chart depicting functions that can be carried out in accordance with the present method. The functions of this method, like those of the other methods disclosed herein, can be embodied in instructions stored on a non-transitory computer-readable medium, such as magnetic or optical data storage (but not merely a transmission line or the like), with the instructions being executable by a processor to carry out the method in whole or in part. Such computer-readable medium could be part of a home carrier's network, such data storage of a BTS, BSC, or MSC for instance.

As shown in FIG. 4, at block 60, the method involves determining an extent to which devices in a coverage area of a home network have roamed from the coverage area of the home network to one or more roaming networks. As discussed above, this roaming could involve communication session initiation in a roaming coverage area following loss of communication in the home coverage area, as well as other possibly more seamless handoff of communication from home coverage to roaming coverage.

At block 62, the method then involves using the determined extent as a basis to set a reverse noise threshold that the home network will then apply as a basis to trigger adjustment in reverse data rate of transmissions in the coverage area of the home network. This function can proceed in the manner discussed above for instance.

Figure 5:
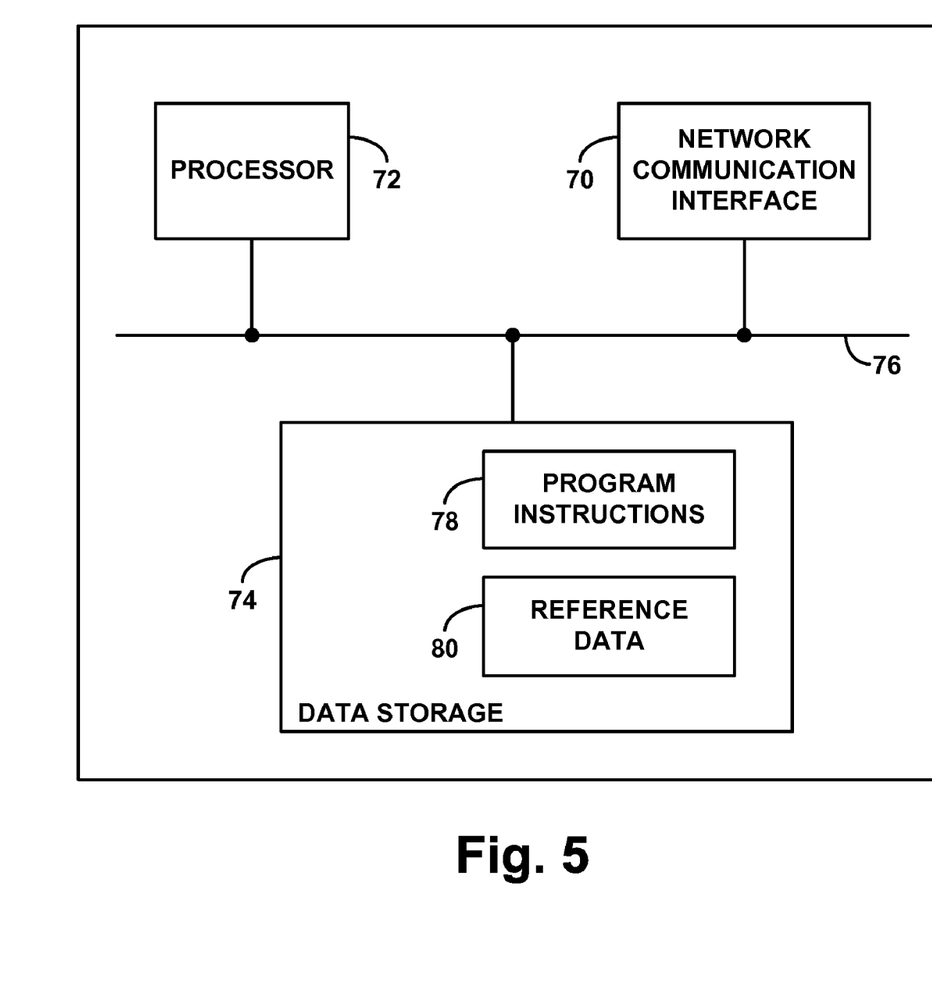
FIG. 5 is a simplified block diagram of a network entity arranged to implement aspects of the present method.

FIG. 5 is next a simplified block diagram of a network entity arranged to carry out functions of the present method. As shown, the network entity includes a network communication interface 70, a processor 72, and data storage 74, all of which may be communicatively linked together by a system bus, network, or other connection mechanism 76.

Communication interface 70 functions to facilitate communication between the network entity and one or more other entities, such as air interface communication with served subscriber devices and/or backhaul communication with other network entities. The communication interface may thus provide for wired and/or wireless communication and may take any of a variety of forms.

Processor 72 may comprise one or more general purpose processors (e.g., INTEL microprocessors) and/or one or more special purpose processors (e.g., application specific integrated circuits) and may integrated in whole or in part with communication interface 70. Data storage 74, in turn, comprises one or more volatile and/or non-volatile storage components, such as magnetic, optical, flash, or organic storage components, and may be integrated in whole or in part with processor 72. Data storage 74 preferably contains program instructions 78 executable by the processor 72 to carry out various functions described herein. Further, data storage 74 may contain reference data 80, such as the correlation data described above for instance, to facilitate implementation of the method in practice.

An exemplary embodiment of the present invention has been described above. Those skilled in the art will appreciate, however, that many variations from the embodiment are possible while remaining within the spirit and scope of the claims.

We claim:

1. A method for managing air interface noise in a particular coverage area of a wireless communication system, wherein the wireless communication system applies a reverse noise threshold for the particular coverage area as a basis to manage reverse transmission power of served devices in the particular coverage area, wherein when the wireless communication system determines that reverse noise in the particular coverage area meets the reverse noise threshold, the wireless communication system causes at least one device served in the particular coverage area to reduce reverse transmission power, wherein reducing reverse transmission power in the particular coverage area helps to reduce reverse noise in the particular coverage area, the method comprising:

a radio access network (RAN) entity detecting threshold usage of wireless communication service in a coverage area other than the particular coverage area, wherein the RAN entity comprises at least one of a base transceiver station, a base station controller, and a mobile switching center, and wherein detecting threshold usage of wireless communication service in the coverage area other than the particular coverage area comprises at least one of (i) programmatically determining, based on records of handoff of devices from the particular coverage area to the other coverage area, that there has been at least a threshold extent of handing off from the particular coverage area to the other coverage area and (ii) when the particular coverage area is a home coverage area and the other coverage area is a roaming coverage area, programmatically determining, based on roaming records, that there has been at least a threshold extent of roaming, in the roaming coverage area, of one or more devices that could instead operate in the home coverage area; and based on at least the detecting, the RAN entity decreasing the reverse noise threshold for the particular coverage area from a first reverse noise threshold down to a second reverse noise threshold, wherein (a) when the reverse noise threshold for the particular coverage area is the first reverse noise threshold and the wireless communication system determines that the reverse noise in the particular coverage area is high enough to meet the first reverse noise threshold, the wireless communication system causes the at least one device served in the particular coverage area to reduce reverse transmission power, and (b) when the reverse noise threshold for the particular coverage area is the second reverse noise threshold and the wireless communication system determines that reverse noise in the particular coverage area meets the second reverse noise threshold even when the reverse noise is not high enough to meet the first reverse noise threshold, the wireless communication system causes the at least one device served in the particular coverage area to reduce reverse transmission power, wherein causing the at least one device served in the particular coverage area to reduce reverse transmission power comprises wirelessly transmitting a control signal for receipt by the at least one device to cause the at least one device to reduce reverse transmission power, thereby helping to reduce reverse noise in the particular coverage area.

2. The method of claim 1, wherein the control signal causes the at least one device served in the particular coverage area to reduce reverse data rate and correspondingly to reduce reverse transmission power.

3. The method of claim 2, wherein the particular coverage area is provided by a home wireless service provider and the other coverage area is provided by a roaming partner of the home wireless service provider.

4. The method of claim 2, wherein the particular coverage area is provided by a wireless service provider and has a first priority level, and wherein the other coverage area is provided the wireless service provider and has a second priority level lower than the first priority level.

5. The method of claim 2, wherein the decreasing is done by the RAN entity automatically in response to the detecting.

6. The method of claim 2, wherein detecting the threshold usage of wireless communication service in the other coverage area comprises:

programmatically determining, based on the records of handoff of devices from the particular coverage area to the other coverage area, that there has been at least the threshold extent of handing off from the particular coverage area to the other coverage area.

7. The method of claim 2, wherein detecting the threshold usage of wireless communication service in the other coverage area comprises:

matching roaming records with records of devices experiencing dropped calls in the particular coverage area, so as to produce data indicating an extent of incidents in which dropped calls in the particular coverage area led to usage in the other coverage area.

8. The method of 2, wherein the control signal comprises a Boolean value of a Reverse Activity Bit (RAB).

9. A method for managing air interface noise in a wireless communication system, wherein when the wireless communication system determines that reverse noise in a coverage area of the wireless communication system meets a reverse noise threshold, the wireless communication system causes at least one device served in the coverage area to reduce reverse data rate, wherein reducing reverse data rate in the coverage area helps to reduce reverse noise in the coverage area, the method comprising:

a radio access network (RAN) entity determining a roam-away level for the coverage area, wherein the RAN entity comprises at least one of a base transceiver station, a base station controller, and a mobile switching center, and wherein determining the roam-away level for the coverage area comprises at least one of (i) programmatically determining, based on records of handoff of devices from the coverage area to one or more roaming network coverage areas, an extent to which devices have handed off from the coverage area to the one or more roaming network coverage areas and (ii) programmatically matching roaming records with records of devices experiencing dropped calls in the coverage area, so as to determine an extent of incidents in which dropped calls in the coverage area led to roaming;

the RAN entity using the determined roam-away level as a basis to set a reverse noise threshold for the coverage area, wherein the RAN entity is arranged to set the reverse noise threshold at first reverse noise threshold level when the roam-away level is a first roam-away level and the RAN entity sets the reverse noise threshold at a second reverse noise threshold level when the roam-away level is a second roam-away level, wherein the second roam-away level is higher than the first roam-away level, and the second reverse noise threshold level is lower than the first reverse noise threshold level; and the wireless communication system using the set reverse noise threshold as a basis to trigger adjustment in reverse data rate of served devices in the coverage area and thus helps to reduce noise in the coverage area, wherein using the set reverse noise threshold as a basis to trigger adjustment in reverse data rate of served devices in the coverage area comprises (a) detecting that reverse noise in the coverage area meets the set reverse noise threshold and (b) responsive to detecting that reverse noise in the coverage area meets the set reverse noise threshold, broadcasting in the coverage area a value that causes the at least one device served in the coverage area to reduce reverse data rate.

10. The method of claim 9, wherein the roam-away level is an extent of roaming from a home network operated by a service provider to a roaming network operated by another service provider.

11. The method of claim 9, further comprising maintaining correlation data that correlates various roam-away levels with reverse noise thresholds, wherein using the determined roam-away level as a basis to set the reverse noise threshold comprises:
   referring to the correlation data to determine a particular reverse noise threshold level corresponding with the determined roam-away level; and
   setting the reverse noise threshold at the determined particular reverse noise threshold level.

12. The method of claim 9, wherein determining the roam-away level for the coverage area comprises:
   programmatically determining, based on the records of handoff of devices from the coverage area to the one or more roaming network coverage areas, the extent to which devices have handed off from the coverage area to the one or more roaming network coverage areas.

13. The method of claim 9, wherein determining the roam-away level for the coverage area comprises:
   programmatically matching the roaming records with the records of devices experiencing dropped calls in the coverage area, so as to produce data indicating the extent of incidents in which dropped calls in the coverage area led to roaming; and
   using the data as a basis to determine the roam-away level.

14. The method of claim 9, wherein the value is a Boolean value of a Reverse Activity Bit (RAB).

15. A non-transitory computer-readable medium having stored thereon instructions executable by a processor to carry out functions comprising:
   determining an extent to which devices in a coverage area of a home network have roamed from the coverage area of the home network to one or more roaming networks, wherein determining the extent to which devices in the coverage area of the home network have roamed from the coverage area of the home network to the one or more roaming networks comprises (i) matching historical roaming records with records of devices experiencing dropped calls in the coverage area of the home network, so as to produce data indicating incidents in which dropped calls in the coverage area led to roaming and (ii) using the data as a basis to determine the extent; and
   using the determined extent as a basis to set a reverse noise threshold that the home network will then apply as a basis to trigger adjustment in reverse data rate of transmissions in the coverage area of the home network, wherein applying the reverse noise threshold as the basis to trigger adjustment in the reverse data rate of transmissions in the coverage area of the home network comprises (a) making a determination of whether reverse noise in the coverage area of the home network is high enough to meet the reverse noise threshold, (b) when the determination is that the reverse noise in the coverage area of the home network is high enough to meet the reverse noise threshold, then broadcasting in the coverage area of the home network a first value that causes served devices in the coverage area of the home network to reduce their reverse data rates, and (c) when the determination is that the reverse noise in the coverage area of the home network is not high enough to meet the reverse noise threshold, then broadcasting in the coverage area of the home network a second value that causes served devices in the coverage area of the home network to increase their reverse data rates.

16. The non-transitory computer-readable medium of claim 15, wherein the non-transitory computer-readable medium is part of the home network.

17. The non-transitory computer-readable medium of claim 15, wherein using the determined extent as a basis to set the reverse noise threshold comprises:
   referring to correlation data to determine a particular reverse noise threshold corresponding with the determined extent; and
   setting the reverse noise threshold to be the determined particular reverse noise threshold.

\* \* \* \* \*